Patented May 6, 1952

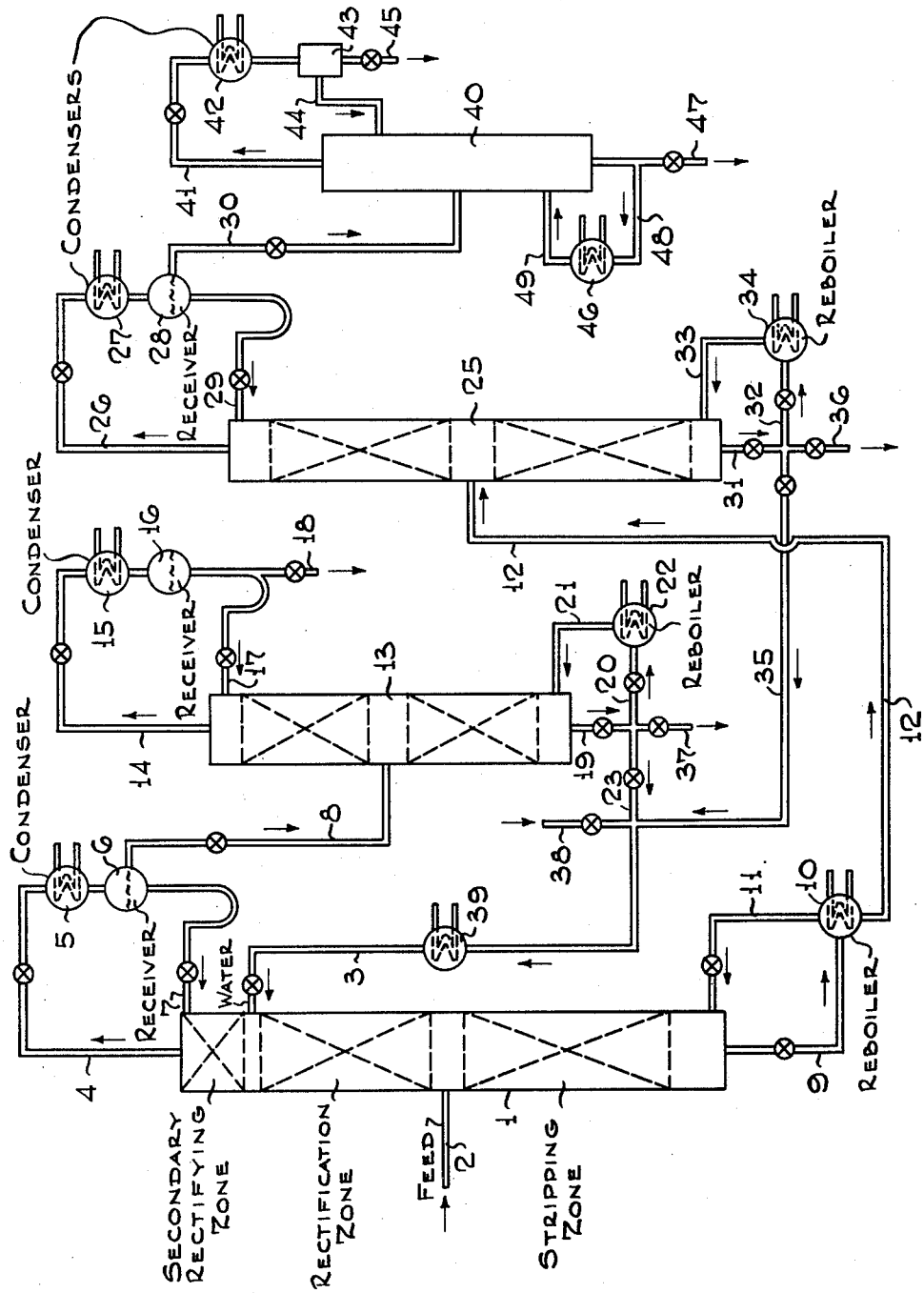

2,595,805

UNITED STATES PATENT OFFICE 2,595,805

EXTRACTIVE DISTILLATION OF CLOSE-BOILING ALCOHOLS HAVING PARTIAL IMMISCIBILITY WITH WATER

Charles E. Morrell, Westfield, N. J., Nat C. Robertson, Corpus Christi, Tex., and Carl S. Carlson, Elizabeth, N. J., assignors to Standard Oil Development Company, a corporation of Delaware Application November 4, 1947, Serial No. 783,990

4 Claims. (Cl. 202—39.5)

This invention relates particularly to a method of using a reflux medium of high water content in a rectification of close-boiling alcohols, including alcohols partially immiscible with water, to accomplish separation and purification of the alcohols.

A problem with which this invention is concerned is the separation of oxygenated organic compounds to be found in close-cut distillates higher boiling than an ethanol cut from aqueous layer and aqueous extraction products obtained in synthesis of organic compounds from carbon monoxide and hydrogen.

Among the principal components of distillate cuts higher boiling than the ethanol cut of aqueous synthesis products are found normal propanol, butanols and pentanols together with other oxygen-containing organic compounds which are difficult to separate by ordinary fractionation.

If the crude aqueous mixtures of the alcohols are subjected to ordinary practical fractionation with removal of an ethanol cut, it is quite feasible to obtain narrow cuts which contain the following types of alcohol mixtures:

*Table I*

[Narrow-boiling range mixtures of alcohols partially immiscible with water.]

| Group | Components | Normal B. P. ° C. | Aqueous Azeotrope B. P. |
|---|---|---|---|
| I | Normal Propanol | 97.2 | 87.7 |
|  | Iso-Butanol | 107.9 | 88.9 |
|  | Secondary Butanol | 99.5 | 88.5 |
|  | Tertiary Pentanol | 101.8 | 87.0 |
| II | Normal Butanol | 117.7 | 92.2 |
|  | Iso-Pentanol | 131.6 | 95.2 |
|  | Secondary Pentanol | 119.2 | 92.3 |
|  | Normal Pentanol | 137.9 | 95.0 |
|  | Pentanol-3 | 115.4 | 91.7 |

It is to be noted that the aqueous azeotropes of the alcohols in the above types of narrow cut mixtures have boiling points which differ less than 5° C., which fact makes difficult their further separation by ordinary practical fractionation even if the narrow boiling range mixture is only a binary or tertiary mixture of the alcohols. Generally, the crude mixtures contain more than two of the alcohols and other oxygenated organic compounds that interfere with separation by ordinary fractionation, but these do not interfere with the basic operation of this invention in isolating the desired principal alcohol components of the mixtures.

One of the most prominent components of an aqueous synthesis product is normal propanol. The major impurities in a crude normal propanol cut boiling from about 82° C. to 92° C. are secondary butanol and iso-butanol. Repeated fractional distillation of such a cut was found to be of no avail for obtaining isolation of pure normal propanol and separation of the butanols. The difficulties encountered can be appreciated by reference to Table I which shows the overlapping of the boiling points. With the present invention it was found possible to effect the critical separations necessary in separating pure normal propanol and even in further separating the butanols despite the fact that the butanols have the same molecular weight and are similarly partially immiscible with water.

To obtain the desired separation of purified organic components from a narrow-boiling range mixture like those mentioned with benefits of the present invention, the mixture may be subjected to a continuous fractional distillation in a colum of practical size, including a rectification zone and a stripping zone, each providing for countercurrent liquid-vapor contact under reboiling and refluxing conditions. By introducing a sufficiently large quantity of water at an upper part of the rectification zone for effectively modifying the relative volatilities of the organic compounds to be separated, distillation of a larger part of one component than of another from the internal reflux is effected while the organic compounds form a single phase homogeneous solution with the water.

Steady state conditions are maintained in the rectification zone with a constant feed rate of crude mixture by continuously supplying the necessary large quantity of water at an upper part of the rectification zone. It is advantageous to have the temperature of the water feed close to the temperature of liquid on the water feed plate, although the water feed temperature may be lowered for partially condensing more vapors ascending to the water feed plate.

Since the efficient operation is essentially continuous, the water is added continuously near the top of the fractionating column while the narrow-boiling range feed mixture of alcohols to be separated is fed continuously into the column at a lower point.

The feed mixture stream is preferentially introduced into the fractionating column between an upper rectification section and a lower stripping section at a point where the ratio of the main components to be separated in the feed is similar to the ratio of these compounds in the internal reflux descending through the column.

Vapors of the organic compounds introduced as a feed stream at the bottom part of the rectification zone pass up through the rectification zone for intimate contact with descending internal liquid reflux under practically equilibrium reboiling and refluxing conditions.

Due to the fact that water continuously in excess of the amount of water distilled is introduced to mix with condensate at the top of the rectification zone, the water concentration in the internal liquid reflux throughout the rectification zone is higher than the water concentration in vapors passing up through the zone. Contrasted therewith, in an ordinary rectification of alcohols from an aqueous feed, the water concentration in the vapors diminishes rapidly as the vapors ascend the fractionating column and the water concentration in the reflux tends toward the minimum corresponding to its azeotrope proportion at the top.

The quantity of water required to be introduced continuously at the upper part of the rectification zone for accomplishing the desired separation of the close-boiling alcohols is considerably greater than the quantity of condensate with which it becomes homogeneously mixed and is considerably in excess of the azeotropic proportion of water. In making the water concentration of the internal reflux substantially above 65 mole percent, so as to have an adequate water concentration in the internal reflux for effecting the separation with a reasonable number of plates or contact stages, the oxygenated organic compounds including the partially water-immiscible alcohols to be isolated are completely dissolved in the aqueous internal reflux and the alcohol to be isolated remains completely dissolved in the internal reflux that reaches the bottom part of the rectification zone, then finally reaches the bottom part of the stripping zone.

The minimum water concentration of the internal reflux for obtaining the separation depends on the particular organic compounds to be separated. In a limiting case, essentially no separation is effected if the internal reflux contains less than 65 mole percent water. For obtaining satisfactory results on a practical scale, more than 80 mole percent and, more advantageously, 85–99 mole percent water, is required in the internal liquid reflux. As the water dilution of the internal reflux becomes infinite, the selectivity of separation is increased but the efficiency is excessively lowered on account of the relatively small quantities of the organic compounds involved.

Under steady state conditions in a fractional distillation zone, the internal reflux having adequate water concentration for accomplishing separation of the close-boiling alcohols tends to have a nearly constant water concentration in a homogeneous liquid phase at each plate between the inlets and outlets, thus the high water concentration is approximately uniform in the internal reflux throughout each fractionation zone section. This internal reflux flowing from the top to the bottom, becomes richer in an alcohol component being isolated while the other organic components of the feed become distilled overhead. Residual portions of internal reflux withdrawn from the fractionating zones are dilute aqueous solutions of the isolated components.

The overhead vapors from the rectification zone are enriched in one or more of the organic components rendered relatively more volatile by the high water concentration in the liquid reflux.

Thus, for example, if iso-butanol and sec-butanol substantially free of normal propanol are withdrawn in the overhead vapor product with accompanying water vapor from the rectification zone, normal propanol remains in the residual internal reflux and can be removed at the same rate that the normal propanol is introduced with the butanols in the feed to the distillation column.

The functioning of the stripping zone may be described as follows:

A dilute aqueous solution of the close-boiling alcohols to be separated, as in the internal liquid reflux from the bottom of the rectification zone, flows downwardly through the stripping zone in countercurrent contact with ascending vapors evolved from the solution under reboiling conditions. A sufficiently high concentration of water is maintained in the liquid flowing down through the stripping zone, as in the rectification zone, to make the liquid progressively richer in one of the components rendered relatively less volatile. Under practically equilibrium reboiling and refluxing conditions in the stripping zone, the organic compounds rendered more volatile are removed as vapor from the stripping zone at the same rate that these components enter the stripping zone, and a dilute aqueous solution of one of the components thus purified is withdrawn from the bottom part of the stripping zone.

A variety of mechanical arrangements may be used for conducting the process, and suitable arrangements are shown diagrammatically in the drawings.

The accompanying drawing illustrates a flow plan of a unit for obtaining separation of two products, e. g., a purified alcohol bottoms product and an overhead product with means for concentrating the products as such.

Referring to the drawing, I represents a fractional distillation column in the interior of which is provided means for obtaining efficient countercurrent liquid-vapor phase contacting, e. g., such conventional means as bubble plates, or packing. The crude feed of mixed organic compounds, including the alcohols which are partly water-immiscible, is charged to column I from an inlet 2 at the bottom of the rectification zone. The water to be added continuously in large quantity as a refluxing medium enters the column I from water feed line 3 at the upper part of the rectification zone. Overhead vapors are withdrawn from the top of column I through line 4 by which they are passed through condenser 5 to a receiver 6. A portion of the condensate cooled in receiver 6 is returned to the top part of column I which has an external reflux through line 7. The remaining portion of distillate liquid or vapor is withdrawn through line 8. Bottoms liquid cooled at the bottom part of column I is passed by line 9 into a reboiler 10 for heating by indirect or direct heat exchange with a heating medium, such as live steam. A heated and partially vaporized portion of the bottoms is recycled from the reboiler 10 by line 11 to the lower part of column I. The remaining portion of the bottoms liquid is passed through line 12.

If sufficient fractionation is provided in a secondary rectification zone above the water feed inlet from line 3 to column I, the distillate collected in receiver 6 may be a composition of an aqueous azeotrope, or approaching thereto for the organic compounds selectively volatilized and distilled overhead from column I.

With water present in the distillate, the distillate requires further processing for separation of the water, as for example, by azeotropic distillation or dehydration such as may be carried out by passing the distillate through line 8 into a concentrating or dehydrating column 13. Column 13 is equipped in a conventional manner with rectifying means, an overhead line 14, cooling condenser 15, a distillate receiver 16 and an external reflux line 17.

In operating column 13 for azeotropic distillation, the aqueous azeotrope distillate may be withdrawn through line 18. Stripped water bottoms collected in the lower part of the column 13 may be partly recycled by lines 19, 20 and 21 through a heat exchange reboiler 22 for supplying heat directly or indirectly through a heat transfer surface to column 13 and a remaining portion of the water bottoms column 13 may be passed through line 23 into the water feed line 3 of column 1, thus conserving on heat energy and make-up water.

Dilute aqueous solution of the isolated organic compound or alcohol collected in the bottom of column 1 and withdrawn through line 12 may be further processed by azeotropic distillation in concentrating column 25. Column 25 is also equipped in a conventional manner for fractional distillation with liquid-vapor phase contacting means, and overhead line 26 for passing overhead vapors to cooling condenser 27, a receiver 28 for distillate from the condenser, a reflux line 29 for returning a portion of the distillate to an upper part of column 25 and a distillate withdrawal line 30. Stripped water bottoms collected at the lower part of column 25 may be recycled by lines 31, 32 and 33 through a heat exchange reboiler 34, and a remaining portion of the bottoms may be passed by line 35 into the water feed line 3 for column 1.

When water in excess of the amounts of water distilled overhead from columns 13 and 25 and that used for recycling is introduced into the system, e. g., with the feed through line 2 or into any of the reboilers 19, 22 and 34 for direct heating by open steam, or any combination of these, this excess may be withdrawn continuously in controlled amounts through lines 36 and 37. Fresh make-up water may be added suitably from line 38 and a heat exchange unit 39 may be placed in line 3 for controlling the feed water temperature.

In view of the fact that such alcohols as n-propanol, butanols, and pentanols are ordinarily utilized as anhydrous products a finishing treatment is generally desired for the distillate product from the concentrating column 25. This treatment is readily carried out by passing distillate in liquid or vapor phase from receiver 28 by line 39 to a finishing column 40.

Column 40 is equipped in a conventional manner for fractional distillation with liquid-vapor phase contacting means, an overhead line 41, for passing overhead vapors to cooling condenser 42, a receiver 43 for distillate from the condenser, a reflux line 44 for returning a portion of distillate to the upper part of column 40, and a distillate withdrawal line 45.

In the finishing treatment a water entraining agent may be used to aid in removing all water from the alcohol product. The various types of entraining agents such as ethers and hydrocarbons, which form aqueous azeotropes having lower boiling temperatures than the alcohol being treated and which undergo liquid phase separation in the cooled distillate, may be used. Generally the organic entraining agent separates as an upper layer in the receiver 43, and may be returned to column 40 through the reflux line 44. The water separated as a lower layer in receiver 45 may be withdrawn from the system, and if this water layer contains sufficient amount of dissolved organic compounds for worthwhile recovery, it may be further processed. The anhydrous alcohol product is withdrawn as bottoms from column 40 through line 47, a portion of this bottoms being recycled by lines 48 and 49 to reboiler 46 if an external reboiler is used.

The alcohols which are partly immiscible with water may be dehydrated without using a water-entraining agent, since these alcohols form a distillate liquid phase which separates from their aqueous distillates.

Various kinds of equipment, such as pumps, flow meters, temperature and pressure regulators, and the like, useful in fractional distillation apparatus may be employed even though omitted from the drawing for the sake of simplicity.

Next to the water-miscible alcohol, ethanol, the most prominent compound present in the aqueous synthesis product from carbon monoxide and hydrogen is normal propanol. The major impurities in a crude normal propanol cut are secondary butanol and isobutanol, which are components shown to have overlapping boiling points in Group I of Table I. The composition of the normal propanol cut will vary somewhat with the synthesis operation and treatments applied to the synthesis product in obtaining the propanol cut. By taking special care in obtaining a normal propanol cut, there have been instances in which the cut gave an alcohol analysis on a dry basis of the order of 84% n-propanol, 12% isobutanol, and 4% sec-butanol, but in many instances the normal propanol cut also contains minor amounts of impurities such as ethanol, isopropanol and carbonyl compounds, e. g., aldehydes, ketones, and esters.

Basic data obtained in the application of the process for the separation and purification of normal propanol from a crude propanol cut clearly demonstrates how the admixture of sufficiently large amounts of water with reflux in the fractional distillation zone makes the impurities much more volatile than the normal propanol enabling the recovery of purified normal propanol in a residual dilute aqueous solution.

The separations obtainable with a high water content in the internal reflux depend upon maintaining a high concentration of the water in a single homogeneous liquid phase with the organic compounds undergoing fractional distillation. Under these circumstances, the components to be separated have different relative volatilities and different volatilities from those existing under ordinary distillation conditions. A non-ideal liquid-phase system is thereby created. The relative volatility is the volatility of one component divided by that of the other. The volatility of each component being proportional to its partial pressure divided by its mole fraction in the liquid phase. With reference to a binary mixture the relative volatility is defined by the equation $$\text{alpha} = (y_1/y_2)/(x_1/x_2)$$

where $y$ refers to the vapor phase mole fractions of the components to be separated and $x$ refers to the liquid phase mole fractions of the components to be separated, the subscript 1 designating the more volatile component and the subscript 2, the less volatile component. Basic experimental data on relative volatilities of the alcohols partially immiscible with water are given in the following table:

Table II

[Relative volatilities of secondary butanol (sec-BuOH) to n-propanol (n-PrOH) in the presence of 96-97 mole percent water. Alcohol analyses expressed on water-free basis.]

| Plate Mixture | Phase | Mole percent H₂O | Mole percent sec-BuOH | Mole percent n-PrOH | Relative Volatility sec-BuOH to n-PrOH (alpha) |
|---|---|---|---|---|---|
| 1 | Vapor | 56.4 | 92.9 | 7.1 | 1.67 |
|   | Liquid | 96.9 | 88.7 | 11.3 |  |
| 2 | Vapor | 53.3 | 75.9 | 20.3 | 1.70 |
|   | Liquid | 97.1 | 70.3 | 31.9 |  |
| 3 | Vapor | 54.4 | 61.9 | 38.5 | 1.68 |
|   | Liquid | 97.1 | 52.2 | 50.6 |  |
| 4 | Vapor | 57.7 | 38.7 | 61.3 | 1.78 |
|   | Liquid | 97.0 | 26.1 | 73.9 |  |
| 5 | Vapor | 59.9 | 13.9 | 86.1 | 1.74 |
|   | Liquid | 97.0 | 8.5 | 91.5 |  |

Table III

[Relative volatilities of secondary butanol (sec-BuOH) to n-propanol (n-PrOH) in the presence of 91 mole percent water in a liquid phase. Alcohol analyses expressed on water-free basis.]

| Plate Mixture | Phase | Mole percent H₂O | Mole percent sec-BuOH | Mole percent n-PrOH | Relative Volatility sec-BuOH to n-PrOH (alpha) |
|---|---|---|---|---|---|
| 1 | Vapor | 56.8 | 94.2 | 5.8 | 1.47 |
|   | Liquid | 91.0 | 91.7 | 8.3 |  |
| 2 | Vapor | 56.6 | 79.7 | 20.3 | 1.41 |
|   | Liquid | 91.0 | 73.6 | 26.4 |  |
| 3 | Vapor | 56.5 | 58.1 | 41.9 | 1.46 |
|   | Liquid | 91.0 | 48.7 | 51.3 |  |
| 4 | Vapor | 56.7 | 37.0 | 63.0 | 1.49 |
|   | Liquid | 91.0 | 28.2 | 71.8 |  |
| 5 | Vapor | 57.2 | 11.4 | 88.6 | 1.52 |
|   | Liquid | 91.0 | 7.8 | 92.2 |  |

Table IV

[Relative volatilities of isobutanol (iso-BuOH) to n-propanol (n-PrOH) in the presence of 97 mole percent water in a liquid phase. Alcohol analyses expressed on water-free basis.]

| Plate Mixture | Phase | Mole percent H₂O | Mole percent iso-BuOH | Mole percent n-PrOH | Relative Volatility iso-BuOH to n-PrOH (alpha) |
|---|---|---|---|---|---|
| 1 | Vapor | 64.3 | 38.1 | 62.0 | 1.71 |
|   | Liquid | 97.3 | 26.4 | 73.6 |  |
| 2 | Vapor | 67.0 | 31.0 | 69.0 | 1.73 |
|   | Liquid | 97.3 | 20.6 | 79.4 |  |
| 3 | Vapor | 63.8 | 25.5 | 74.5 | 1.81 |
|   | Liquid | 97.4 | 15.9 | 84.1 |  |
| 4 | Vapor | 65.6 | 12.7 | 87.3 | 2.02 |
|   | Liquid | 97.3 | 6.7 | 93.3 |  |
| 5 | Vapor | 65.2 | 8.5 | 91.5 | 2.07 |
|   | Liquid | 97.4 | 4.3 | 95.7 |  |

Table V

[Relative volatilities of isobutanol (iso-BuOH) to n-propanol (n-PrOH) in the presence of 91 mole percent water in a liquid phase. Alcohol analyses expressed on water-free basis.]

| Plate Mixture | Phase | Mole percent H₂O | Mole percent iso-BuOH | Mole percent n-PrOH | Relative Volatility iso-BuOH to n-PrOH (alpha) |
|---|---|---|---|---|---|
| 1 | Vapor | 62 | 49.6 | 50.4 | 1.20 |
|   | Liquid | 91 | 45.1 | 54.9 |  |
| 2 | Vapor | 59 | 36.2 | 63.8 | 1.15 |
|   | Liquid | 91 | 33.1 | 66.9 |  |
| 3 | Vapor | 62 | 27.4 | 72.6 | 1.21 |
|   | Liquid | 91 | 23.8 | 76.2 |  |
| 4 | Vapor | 62 | 13.5 | 86.5 | 1.49 |
|   | Liquid | 91 | 9.4 | 90.6 |  |

The data in Tables II to V show very clearly the large concentration of water present in the liquid phase with the mixed alcohols increases the relative volatility of the butanols with respect to the normal propanol regardless of which alcohol is in preponderance in any of the equilibrium mixtures which correspond to mixtures present on various plates in the fractionating column. The data also indicate that by increasing the water concentration in the liquid phase the relative volatility of the butanols to the n-propanol is made greater with a reversal of the normal volatilities.

The complete separation of normal propanol from the butanols and other contaminants in a crude n-propanol cut was shown to be practicable in a continuous fractional distillation column operated in accordance with the principles outlined, the column being equipped with an upper rectifying section, a lower stripping section, an intermediate feed section, and a top water feed section as illustrated in the drawing. The aqueous mixtures of the alcohols containing other close-boiling oxygen-containing impurities were subjected to continuous fractional distillation in the column supplied with sufficient water to maintain the high concentration of water in the liquid phase so as to give the necessary increase in relative volatilities of the impurities to the alcohol isolated in a dilute aqueous solution as bottoms from the column.

As an example, a continuous fractional distillation column having 60 plates was charged with a crude n-propanol cut (84-92° C. distillation range) formed by a synthesis of carbon monoxide with hydrogen in the presence of an iron catalyst. Concentrations of water between 65 and 95 mole percent were maintained in the internal reflux. The n-propanol cut charge was preheated to from 70-95° C. With reasonable external reflux ratios, a satisfactory distillation was obtained. The purified n-propanol recovered as dilute aqueous bottoms was concentrated for analysis which showed that over 90 weight percent of the impurities were removed, these impurities including aldehyde, ketone, ester, and a small amount of carboxylic acid compounds with the butanols.

In dehydrating the dilute aqueous solution of the isolated n-propanol, diisopropyl ether proved quite satisfactory for obtaining good phase separation from the entrained water in the ether azeotrope so as to reduce the water content of the n-propanol to about 0.1 weight percent.

An interesting and significant fact brought to light by the present invention is that the normal alcohols can be segregated from their slightly lower boiling branched isomers while they are simultaneously separated from branched alcohols of their higher molecular weight homologs that form close-boiling azeotropes. This is important in making possible the recovery of pure n-propanol from a crude mixture containing its branched isomer, isopropanol, as well as branched isomers of butanol; similarly it is important in separating normal butanol from mixtures containing its branched isomers. These facts are demonstrated by the following basic data:

Table VI

[Relative volatilities with 85-99 mole percent H₂O in liquid phase.]

| Mixtures Separated, Components | | Relative Volatility, A to B |
|---|---|---|
| A | B | |
| isoPrOH | n-PrOH | 1.32-1.45 |
| secBuOH | n-PrOH | 1.41-1.78 |
| isoBuCH | n-PrOH | 1.15-2.07 |
| secBuOH | n-BuOH | 1.81-2.08 |
| isoBuOH | n-BuOH | 1.57-1.78 |

Thus, a crude n-propanol cut having an initial boiling point of about 80 to 82° C. may contain isopropanol, which has an anhydrous boiling point of 82.4° C. and an aqueous azeotrope boiling point of 80.4° C., and with adequate high water concentration in the internal liquid reflux, this lower boiling contaminant can be volatilized and distilled away with the higher boiling branched butanols from the n-propanol.

Similarly, in separating normal butanol from the impurities associated therewith in an n-butanol cut as shown in Group 2, of Table I, the relative volatilities of isopentanol, secondary pentanols and normal pentanol are increased by use of large concentrations of water in the liquid phase and, at the same time, the ordinarily associated impurities such as carbonyl compounds are separated from the n-butanol. This is a very important separation, because the secondary pentanols (pentanol-2 and pentanol-3) not only form close-boiling aqueous azeotropes with n-butanol but also differ in their anhydrous boiling point from the boiling point of anhydrous n-butanol by less than 3 centrigrade degrees.

The separation of n-pentanol from isomeric hexanols is also one which is difficult to carry out by ordinary fractionation but which can be carried out in accordance with the principles of this invention.

The process of this invention can also be used for making less exact separations of the alcohols and their associated impurities, as illustrated by some of the examples, in which simply the relative proportions of the compounds are altered by distillation through a series of stages, each of which has a high water content maintained in the internal refluxing liquid phase, the number and efficiency of the stages determining the degree of separation obtained for a given concentration of water in the liquid phase. This process can be used for the complete or partial separation, as desired, of any mixture of the aqueous azeotrope-forming, partly water-immiscible alcohols, especially those having 3 to 6 carbon atoms per molecule, with or without the presence of other neutral oxygenated organic compounds even when the mixed components or their azeotropes with water have boiling points close to or within the range of the alcohol-azeotropes in the mixture being separated. If the initial alcohol mixture contains low-boiling water-miscible alcohols, such as ethanol, as an impurity, this alcohol can be separated by a close initial fractionation of the mixture or in the subsequent finishing distillation of the isolated alcohol product. This is possible because of the relatively low boiling point of ethyl alcohol and the fact that in dehydrating the partly immiscible alcohol product, the water-miscible alcohol is removed with the aqueous distillate.

The water used as a refluxing medium may contain dissolved salt which makes it possible to further increase the relative volatility spread of the close-boiling alcohols. The salt solutions offer the further advantage of satisfactorily lowering the concentration of water in the overhead product, the water concentration in the internal liquid reflux being maintained at the same high level. The salt used should be selected with care to avoid undesired effects of corrosion, undue decomposition, liquid-phase precipitation and catalyzing reactions of the organic compounds.

Although generally the fractional distillation is to be carried out at about atmospheric pressure it may be carried out at below or above atmospheric pressure.

As already mentioned, the overhead and bottoms products from the fractional distillation in the presence of the liquid water refluxing medium, at present given the term "aquafluxing," can be further processed to remove water by physical and/or chemical dehydrating, e. g. azeotropic distillation treatment, treatment with chemical drying agents, or the like.

We claim:
1. A process for separating a mixture consisting essentially of at least one normal $C_3$ to $C_4$ alkanol (A) and at least one branched $C_3$ to $C_5$ alkanol (B), the aqueous boiling points of the normal and branched alkanols differing by less than 5° C. which comprises introducing a mixture of said normal and branched alkanols to a fractional distillation zone at an intermediate point thereof, introducing sufficient water to the fractional distillation zone at a point substantially above the alkanol mixture feed point to maintain an internal liquid aqueous reflux having a water content in the range of 85 to 99 mol percent below the point of addition of the water, applying heat to the fractional distillation zone whereby vapors of the alkanols together with water vapor ascend through the fractional distillation zone in countercurrent contact with the internal aqueous liquid reflux, removing overhead from the fractional distillation zone a vaporous mixture comprising alkanol (B) substantially free from alkanol (A), and removing from a bottom portion of the fractional distillation zone a water solution of substantially pure alkanol (A).

2. A method according to claim 1 in which at least one branched alcohol selected from the group consisting of isopropanol, isobutanol, and secondary butanol is separated overhead from normal propanol.

3. The method according to claim 1 in which at least one branched alcohol selected from the group consisting of isobutanol and secondary butanol is separated overhead from normal butanol.

4. The method according to claim 1 in which at least one branched alcohol selected from the group consisting of isobutanol, secondary butanol and the branched pentanols is separated overhead from normal butanol.

CHARLES E. MORRELL.
NAT C. ROBERTSON.
CARL S. CARLSON.

REFERENCES CITED

The following references are of record in the file of this patent:

UNITED STATES PATENTS

| Number | Name | Date |
|---|---|---|
| 996,328 | Guillaume | June 27, 1911 |
| 2,290,442 | Metz | July 21, 1942 |
| 2,551,584 | Carlson et al. | May 8, 1951 |
| 2,551,593 | Gilliland et al. | May 8, 1951 |
| 2,551,626 | Morrell et al. | May 8, 1951 |